UNITED STATES PATENT OFFICE.

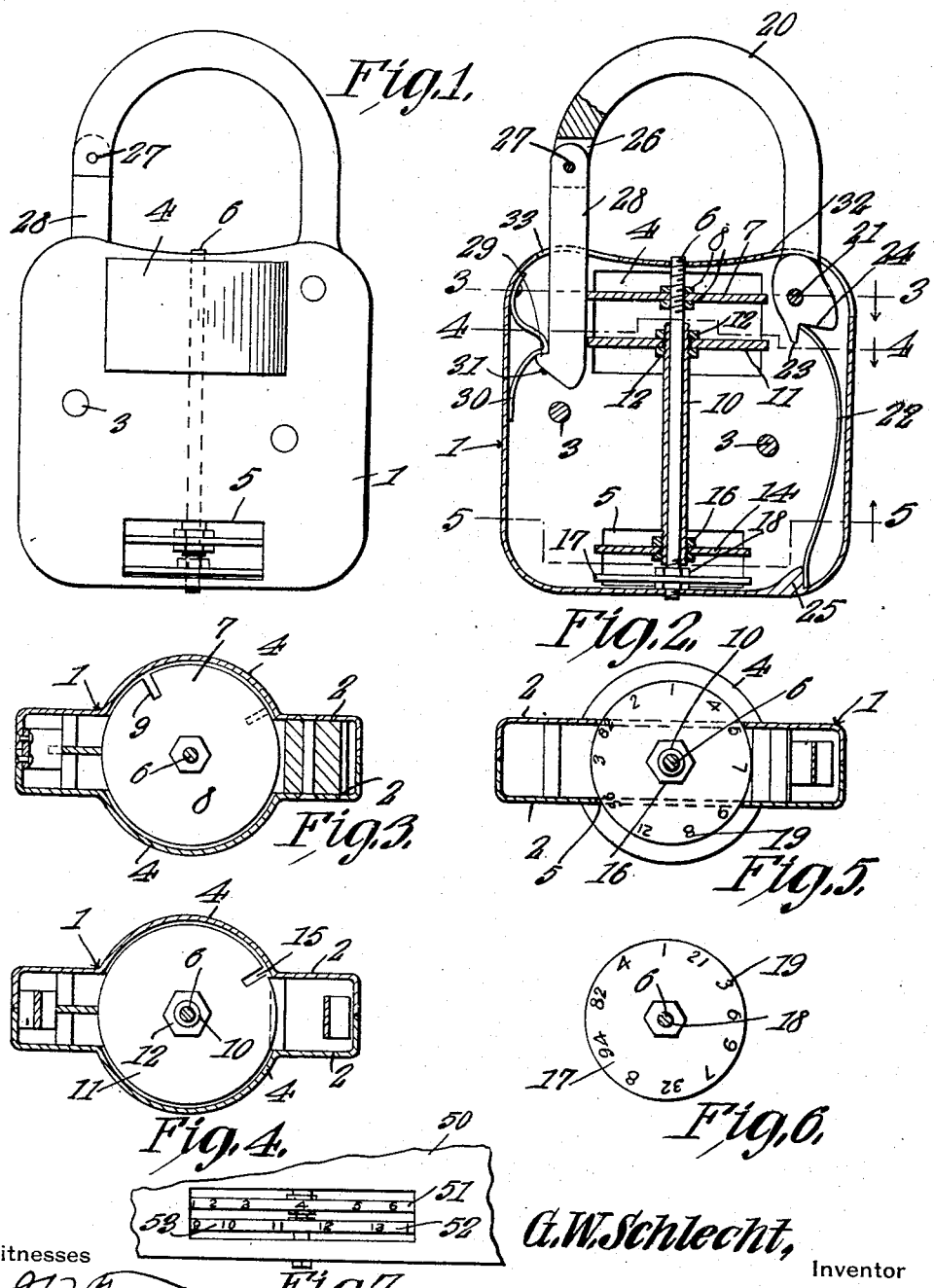

GEORGE W. SCHLECHT, OF ELKHART, INDIANA.

PERMUTATION-LOCK.

1,198,587.

Specification of Letters Patent.  Patented Sept. 19, 1916.

Application filed January 21, 1916.  Serial No. 73,395.

*To all whom it may concern:*

Be it known that I, GEORGE W. SCHLECHT, a citizen of the United States, residing at Elkhart, in the county of Elkhart and State of Indiana, have invented a new and useful Permutation-Lock, of which the following is a specification.

The device forming the subject matter of this application is a permutation lock, the novel features of the invention being embodied in a pad lock, although the pad lock construction need not be adhered to.

The invention aims to provide a simple permutation mechanism not likely to get out of order, and to provide novel means whereby the shackle may be interlocked with the case irrespective of the positions of the tumblers.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in side elevation, the device forming the subject matter of this application, the same having been embodied in a pad lock; Fig. 2 is a longitudinal section of the structure shown in Fig. 1, parts appearing in elevation; Fig. 3 is a cross section on the line 3—3 of Fig. 2; Fig. 4 is a cross section on the line 4—4 of Fig. 2; Fig. 5 is a cross section on the line 5—5 of Fig. 2; Fig. 6 is a plan of one of the permutation disks, the shaft thereof being shown in section. Fig. 7 is a fragmental elevation showing a modified form of the invention.

The lock forming the subject matter of this application preferably is made of metal throughout and embodies a case 1 comprising parts 2 held together by rivets 3 or otherwise. The parts 2 of the case 1 adjacent what may be denominated the top of the case, are provided with outwardly bulged extensions 4. Near to the bottom of the case 1, the constituent parts 2 thereof are provided with openings 5.

Journaled at its upper and lower ends in the case 1 is a main shaft 6 upon which is mounted for circumferential adjustment, a tumbler 7, held in place upon the shaft by means of nuts 8 threaded onto the shaft. The tumbler 7 is provided with a peripheral notch 9.

Journaled on the main shaft 6 is a tubular secondary shaft 10 on which is rotatable for adjustment, a tumbler 11 held in place by nuts 12 threaded onto the secondary shaft. The tumbler 11 is supplied with a peripheral notch 15. The tumblers 11 and 7 extend laterally into the outwardly bulged portions 4 of the case 1, as Figs. 3 and 4 will make manifest.

Mounted for circumferential adjustment on the lower end of the tubular secondary shaft 10 is a permutation disk 14 held in place by nuts 16 threaded onto the said shaft. A permutation disk 17 is circumferentially adjustable upon the lower end of the main shaft 6 and is held in place by means of nuts 18 threaded onto the lower end of the shaft. Adjacent their peripheries, the permutation disks 17 and 14 are provided with characters 19. The disks 17 and 14 project through the opening 5 in the case 1, as shown in Fig. 5.

The invention comprises a shackle 20 mounted to swing on a pivot element 21 carried by the case 1, the shackle passing outwardly through an opening 32 in the top of the case.

The numeral 22 designates a spring received in a notch 24 fashioned in the inner end of the shackle 20, there being a finger 23 on the inner end of the shackle, against which finger the end of the spring 22 abuts. The tendency of the spring 22 is to swing the shackle 20 to an open position. The lower end of the spring 22 abuts against the bottom portion of the case 1 and is retained by a projection 25 on the case. In the free end of the shackle 20 there is formed a notch defining ears 26 carrying a pivot element 27. One end of a link 28 is disposed between the ears 26 and is mounted to swing on the pivot element 27. The other end of the link 28 is adapted to pass through an opening 33 in the case 1 and is provided with a shoulder 29 adapted to coact with a spring keeper 30 on the interior of the case 1, to hold the shackle 20 in a closed position, the link 28 being beveled at its end as shown at 31, so as to engage automatically with the keeper 30, as shown in Fig. 2.

In practical operation, when the notches 15 and 9 are out of alinement with the link 28, the link 28 is engaged by the peripheries of the tumblers 7 and 11 and is held in engagement with the spring keeper 30. The shackle 20 cannot, under such circumstance be pulled to an open position, until the notches 9 and 15 are brought into alinement with each other and into alinement with the link 28. When the notches are thus alined, however, the link 28 may be swung to the right, referring to Fig. 1, and will enter the notches, the shoulder 29 on the link 28 in this manner being withdrawn from engagement with the keeper 30. It is possible to move the shackle 20 to a closed position when the notches 9 and 15 are not in alinement with each other and with the link 28. Under such circumstances, the inner edge of the link 28 rides downwardly along the peripheries of the tumblers 7 and 11, the beveled end 31 of the link 28 engages with the spring keeper 30 and compresses the same and, ultimately, the shoulder 29 on the link 28 interlocks with the keeper 30.

In order to aline the notches 9 and 15, the tumbler 7 is rotated by means of the main shaft 6 and the disk 17, the tumbler 11 being rotated by means of the secondary shaft 11 and the disk 14, these disks being accessible through the opening 5. A proper combination of the characters 19 on the disks 14 and 17 is selected and when these characters are lined up, the notches 15 and 9 will be alined with each other and with the link 28. The nuts 16 may be loosened to permit an adjustment of the disk 14, the nuts 18 may be loosened to permit an adjustment of the disk 17, the nuts 12 permit an adjustment of the tumbler 11, and the nuts 8 are movable to permit an adjustment of the tumbler 7. From the foregoing it will be obvious that many combinations may be set up, such combinations being changed from time to time, when a predetermined combination has become known to unauthorized persons.

In Fig. 7, wherein a modified form of the invention is shown, the case appears at 50 and the permutation disks at 51 and 52. The distinguishing characteristic of this modification is that the characters 53 are located on the peripheries of the disks.

Having thus described the invention, what is claimed is:—

1. In a permutation lock, a case provided in its side wall with an opening; a shaft journaled in the case and disposed parallel to said side wall; a permutation disk secured to the shaft within the case and disposed at right angles to said wall, the disk being accessible through the opening; a tumbler secured to the shaft and provided with a notch; a spring keeper in the case and disposed opposite to the tumbler; and a locking member insertible into the case between the keeper and the edge of the tumbler, at right angles to the tumbler, the locking member having a smooth inner edge slidably engaged by the periphery of the tumbler, and having a shoulder engaged with the keeper, the locking member being transversely movable to retire into the notch under the action of the spring keeper, the locking member being beveled to permit the shoulder to engage with the keeper.

2. In a permutation lock, a case; a shaft journaled in the case; a permutation disk secured to the shaft; a tumbler secured to the shaft and provided with a notch; a spring keeper in the case and located opposite to the tumbler; and a locking member insertible between the keeper and the edge of the tumbler, the locking member having a smooth inner edge slidably engaged by the periphery of the tumbler and having a shoulder engaged with the keeper, the locking member being transversely movable to retire into the notch, under the action of the spring keeper.

In testimony that I claim the foregoing as my own, I have hereto affixed my signature in the presence of two witnesses.

GEORGE W. SCHLECHT.

Witnesses:
J. RAYMOND CONLEY,
ORRIN M. CONLEY.

Copies of this patent may be obtained for five cents each, by addressing the "Commissioner of Patents, Washington, D. C."